United States Patent [19]
Vijayendran et al.

[11] Patent Number: 5,356,983
[45] Date of Patent: Oct. 18, 1994

[54] PARTICULATE AMMONIUM PHOSPHATE OF SMALL SIZE

[75] Inventors: Bhima R. Vijayendran, Monroeville; Seetha Eswarakrishnan, Allison Park; Carol L. Knox, Monroeville, all of Pa.

[73] Assignee: PPG Industries, Inc., Pittsburgh, Pa.

[21] Appl. No.: 24,710

[22] Filed: Mar. 1, 1993

[51] Int. Cl.$^5$ ............................ C08K 3/28; C08K 3/34
[52] U.S. Cl. ..................................... 524/416; 524/100; 524/101
[58] Field of Search ................. 524/416, 100, 101; 523/205

[56] References Cited

U.S. PATENT DOCUMENTS

| | | | |
|---|---|---|---|
| 3,795,637 | 3/1974 | Kandler et al. | 524/416 |
| 4,193,945 | 3/1980 | Bertelli et al. | 524/416 |
| 4,198,493 | 4/1980 | Marciandi | 524/416 |
| 4,772,642 | 9/1988 | Staendeke | 523/205 |
| 4,960,803 | 10/1990 | Muhl et al. | 521/106 |

OTHER PUBLICATIONS

Fischer Scientific Catalog, Date Unknown, "Sieves", p. 1442.
Fischer Scientific 81, "FISHERbrand" U.S. Standard Sieves, p. 1083.
N. A. Lange, *Handbook of Chemistry*, 8th Ed., 1952, Handbook Publishers, Inc., Sandusky, Ohio, pp. 877–879.
R. E. Kirk et al, *Encyclopedia of Chemical Technology*, vol. 12, The Interscience Encyclopedia, Inc., New York, pp. 480–485.

*Primary Examiner*—Kriellion S. Morgan
*Attorney, Agent, or Firm*—George D. Morris

[57] ABSTRACT

Small particles of ammonium dihydrogen phosphate, diammonium hydrogen phosphate, or a mixture thereof provide a higher Limiting Oxygen Index ("LOI") to polyolefin compositions containing the small particles than do larger particles of the same substance. In many instances, improvement in one or more other properties, such as for example, processability, appearance, UL-94 rating, tensile strength, tensile modulus, and/or elongation at break is also obtained.

17 Claims, No Drawings

PARTICULATE AMMONIUM PHOSPHATE OF SMALL SIZE

Ammonium phosphate such as ammonium dihydrogen phosphate ($NH_4H_2PO_4$), diammonium hydrogen phosphate (($NH_4$)$_2HPO_4$), or a mixture thereof is an important ingredient for providing fire retardancy to polyolefins. Ammonium phosphate can be used alone or it can be used with various synergists. In polyolefin systems ammonium phosphate is generally, but not necessarily, used with one or more carbonific and/or spumific agents.

The use of polyolefins for insulating electrically conducting wiring is known. Generally the polyolefin is extruded around the wire during manufacture. The polyolefin insulation is a good electrical insulator. The main disadvantage of polyolefin insulation is its flammability. Once ignited, the burning polyolefin produces copious amounts of smoke and drips burning liquid polyolefin which tends to spread the fire. Polyolefin insulated wires and cables and bundles of these are therefore substantial firehazards. It is commonplace in buildings and ships to have bundles of insulated electrical wires and cables passing through openings in walls or bulkheads to expedite the delivery of electrical power from room to room. In time of fire these openings can be instrumental in spreading the fire and smoke from room to room.

Various fire retardants have been admixed with the polyolefin in order to provide fire retardancy to the composition. These have been only partially successful, however, because most fire retardants are not very compatible with polyolefins or because they are prohibitively expensive for commercial applications.

One approach that has been followed is the incorporation of materials which impart intumescence to the polyolefin-based insulation composition. Such intumescent compositions form adherent chars which swell up and impede further burning of the underlying composition. One class of intumescent compositions used for electrical wiring insulation comprises polyolefin, ammonium phosphate, and at least one carbonific or spumific. Carbonifics are nonresinous materials which produce large volumes of both nonflammable gas and carbon in the presence of phosphoric acid. Carbonific materials are generally carbohydrates or polyfunctional alcohols such as pentaerythritol. Spumifics are materials which release large quantities of gas at elevated temperatures. Spumifics are often resinous in nature and often act as binders in addition to forming gas. Spumific materials are most often amides or amines such as urea, guanidine, or dicyandiamide, which liberate gaseous pyrolysis products.

Ammonium phosphate is particularly useful because it yields phosphoric acid at temperatures below the decomposition temperatures of the carbonifics and spumifics and yet above the normal temperatures used for processing the intumescent composition and because it is inexpensive.

It has now been found that the use of small particles of ammonium phosphate as a flame retardant provides a higher Limiting Oxygen Index ("LOI") than do larger particles of the same substance. In many instances, improvement in one or more other properties, such as for example, processability, appearance, UL-94 rating, tensile strength, tensile modulus, and/or elongation at break is also obtained.

Accordingly, in a composition comprising polyolefin and particles of ammonium phosphate selected from the group consisting of ammonium dihydrogen phosphate, diammonium hydrogen phosphate, and a mixture of ammonium dihydrogen phosphate and diammonium hydrogen phosphate, which particles are distributed throughout the polyolefin, tile invention is the improvement wherein at least 90 percent by weight of the particles of ammonium phosphate have sizes of 150 micrometers or smaller.

The ammonium phosphate particles of the invention may be prepared by size reduction of larger ammonium phosphate particles. The methods of size reduction which may be employed are themselves well known for the size reduction of other materials and include milling, grinding, and pulverizing.

At least 90 percent by weight of the particles of ammonium phosphate have sizes of 150 micrometers or smaller. Often at least 93 percent by weight of the particles of ammonium phosphate have sizes of 150 micrometers or smaller. Preferably, at least 95 percent by weight of the particles of ammonium phosphate have sizes of 150 micrometers or smaller.

The types of polyolefin which may be used in the present invention are many and widely varied. The preferred polyolefins include polyethylene (high density, median density, low density, linear low density, or mixtures), polypropylene (atactic, isotactic, syndiotactic, stereoblock, or mixtures), copolymers of ethylene and propylene, copolymers of ethylene and vinyl acetate, and mixtures thereof.

The amounts of ammonium phosphate particles which are present in compositions of the invention are subject to wide variation. Ordinarily the weight ratio of the ammonium phosphate particles to the polyolefin is in the range of from 10:100 to 100:100. Often the weight ratio is in the range of from 15:100 to 85:100. A weight ratio in the range of from 20:100 to 70:100 is preferred.

In many cases the composition also comprises carbonific, spumific, or a mixture of carbonific and spumific. The amounts of the carbonific, spumific, or mixture thereof which may be present in compositions of the invention are subject to wide variation. Ordinarily the weight ratio of the carbonific, spumific, or mixture thereof to the polyolefin is in the range of from 1:100 to 100:100. Often the weight ratio is in the range of from 3:100 to 60:100. A weight ratio in the range of from 5:100 to 25:100 is preferred.

One or more other materials which will increase fire retardancy may optionally be present in the composition. Examples of such materials include zinc oxide, zinc borate, and magnesium oxide.

The compositions of the invention may optionally contain plasticizers, pigments, dyes, tints, antioxidants, visible light stabilizers, ultraviolet light stabilizers, and the like.

The listing of optional ingredients discussed above is by no means exhaustive. These and other ingredients may be employed in their customary amounts for their customary purposes so long as they are not antagonistic to flame retardant performance and good polymer formulating practice.

The compositions of the present invention have fire retardant characteristics and find many uses. They may be extruded into fibers, films, or other shapes, or molded, shaped, or formed into substantially any form. A preferred use, however, is as electrical insulation for wires and cables.

The invention is further described in conjunction with the following examples which are to be considered illustrative rather than limiting, and in which all parts are parts by weight and all percentages are percentages by weight unless otherwise specified.

The appropriate amounts of polyethylene and additives were mixed in a Brabender mixer at 150° C. for 5 minutes. The mixed composition was pressed out to form plaques having a thickness of 3.2 millimeters (⅛ inch).

LOI was determined using apparatus described in ASTM D 2863-87 and the following procedure:

1. Cut 10 to 20 bars having the dimensions 76.2 millimeters x 6.4 millimeters x 3.2 millimeters (3 inches x ¼ inch x ⅛ inch) from the plaque.
2. Make a mark on each bar 50.8 millimeters (2 inches) from an end. 3. Place a bar in the holder of the test column with the mark towards the bottom and place the glass sleeve over the bar. 4. Select the desired concentration of oxygen based on experience with similar materials. If there is no experience with similar material, light a specimen in the air and note the burning. If the specimen burns rapidly, select an initial oxygen concentration of about 18%, but if the specimen goes out, select an initial oxygen concentration of about 25% or higher depending on the difficulty of ignition.
5. Consult a flow setting guide to select a total flow rate and set the flow meters to achieve the desired oxygen concentration.
6. Verify the oxygen level by reading the meters.
7. Allow the gas to flow for 45 to 60 seconds to purge the system.
8. Light the bar. When the bar is well lighted, i.e., when the entire top was burning, remove the ignition flame and start timing the burn.
9. If the bar burns more than 3 minutes or the flame reaches the mark, the concentration of oxygen must be decreased.
10. If the bar extinguishes itself before reaching the mark in less than 3 minutes, the concentration of oxygen must be increased.
11. Continue repeating steps 4-10 until the critical concentration of oxygen, i.e., the lowest concentration of oxygen that will sustain burning for more than 3 minutes or past the mark, is determined.

Additional bars were formed from plaques as described above in respect of the LOI determination except that these additional bars had the dimensions 127 millimeters x 12.7 millimeters x 3.2 millimeters (5 inches x ½ inch x ⅛ inch) Some of the additional bars were tested for flammability in accordance with the procedure of Vertical Burning Test 94, dated Feb. 1, 1974, of Underwriters Laboratories, Inc. The results are reported as 94 V classifications in accordance with that procedure.

Tensile strengths and elongations at break were determined in accordance with ASTM D 638-89.

EXAMPLES

Three different samples of ammonium dihydrogen phosphate ("MAP") were ground to provide the size distributions shown in Table 1.

TABLE 1

| Identity | Size Distribution |
|---|---|
| MAP-G | 1 wt % <150 μm |
|  | 5 wt % <250 μm |
|  | 45 wt % <500 μm |

TABLE 1-continued

| Identity | Size Distribution |
|---|---|
| MAP-P | 95 wt % <850 μm |
|  | 30 wt % <25 μm |
|  | 50 wt % <40 μm |
|  | 100 wt % <150 μm |
| MAP-U | 50 wt % <5 μm |
|  | 85 wt % <10 μm |
|  | 100 wt % <30 μm |

Formulations for compositions having 25% or 30% loadings of additives are shown in Table 2.

TABLE 2

| Component | 25% Loading | 30% Loading |
|---|---|---|
| NA-960 Polyethylene (Quantum USI) | 37.5 g | 35.0 g |
| Ammonium Dihydrogen Phosphate (without regard to particle size) | 9.38 g | 11.25 g |
| Tris(2-hydroxyethyl) isocyanurate [CAS 839-90-7] | 1.88 g | 2.25 g |
| Melamine [CAS 108-78-1] | 1.25 g | 1.50 g |

The results of testing compositions of varying additives loadings and ammonium dihydrogen phosphate particle sizes are shown in Table 3.

TABLE 3

|  | MAP-G | MAP-P | MAP-U |
|---|---|---|---|
| 25% Loading |  |  |  |
| LOI | 23.5 | 25.5 | 28.5 |
| UL-94 (3.2 mm) | V-2 | V-0 | V-0 |
| Appearance | Gritty | Smooth | Smooth |
| Tensile Strength, MPa | 13.03 | 13.62 | 13.79 |
| Elongation at Break, % | 38 | 80 | 80 |
| 30% Loading |  |  |  |
| LOI | 26.5 | 30.5 | 30.5 |
| UL-94 (3.2 mm) | V-0 | V-0 | V-0 |
| Appearance | Gritty | Smooth | Smooth |
| Tensile Strength, MPa | 11.93 | 13.17 | 12.99 |
| Elongation at Break, % | 30 | 72 | 68 |

The data show that smaller particle sizes of ammonium dihydrogen phosphate provide higher LOI's, improved appearance, greater tensile strengths, and greater elongations at break. The data also show that a UL-94 classification of V-O can be obtained at lower loadings when smaller sizes of MAP particles are used.

Although the present invention has been described with reference to specific details of certain embodiments thereof, it is not intended that such details should be regarded as limitations upon the scope of the invention except insofar as they are included in the accompanying claims.

We claim:

1. In a composition comprising polyolefin and particles of ammonium phosphate selected from the group consisting of ammonium dihydrogen phosphate, diammonium hydrogen phosphate and a mixture of ammonium dihydrogen phosphate and diammonium hydrogen phosphate, which particles are distributed throughout said polyolefin, the improvement wherein at least 90 percent by weight of said particles of ammonium phosphate have sizes of 150 micrometers or smaller.

2. The composition of claim 1 wherein at least 93 percent by weight of said particles have sizes of 150 micrometers or smaller.

3. The composition of claim 1 wherein at least 95 percent by weight of said particles have sizes of 150 micrometers or smaller.

4. The composition of claim 1 wherein said polyolefin is polyethylene.

5. The composition of claim 1 wherein the weight ratio of said ammonium phosphate particles to said polyolefin is in the range of from 10:100 to 100:100.

6. The composition of claim 5 wherein said polyolefin is polyethylene.

7. The composition of claim 1 wherein the weight ratio of said ammonium phosphate particles to said polyolefin is in the range of from 15:100 to 85:100.

8. The composition of claim 7 wherein said polyolefin is polyethylene.

9. The composition of claim 1 wherein the weight ratio of said ammonium phosphate particles to said polyolefin is in the range of from 20:100 to 70:100.

10. The composition of claim 9 wherein said polyolefin is polyethylene.

11. The composition of claim 1 which also comprises carbonific, spumific, or a mixture of carbonific and spumific.

12. The composition of claim 11 wherein the weight ratio of said carbonific, spumific, or mixture thereof to said polyolefin is in the range of from 1:100 to 100:100.

13. The composition of claim 1 wherein:
(a) said polyolefin is polyethylene;
(b) at least 95 percent by weight of said particles have sizes of 150 micrometers or smaller; and
(c) the weight ratio of said ammonium phosphate particles to said polyethylene is in the range of from 20:100 to 70:100.

14. The composition of claim 13 which also comprises carbonific, spumific, or a mixture of carbonific and spumific.

15. The composition of claim 14 wherein said ammonium phosphate is ammonium dihydrogen phosphate.

16. The composition of claim 13 wherein said ammonium phosphate is ammonium dihydrogen phosphate.

17. The composition of claim 1 wherein said ammonium phosphate is ammonium dihydrogen phosphate.

* * * * *